May 24, 1966 G. W. PRESTON ET AL 3,253,277
RADAR SYSTEM EMPLOYING SEQUENTIAL ANALYSIS
Filed Sept. 4, 1959 2 Sheets-Sheet 1

INVENTORS.
GLENN W. PRESTON
WALTER H. CHUDLEIGH, JR.
BY Jacob Trachtman
ATTORNEY.

Fig. 3.

TIME IN SWEEP PERIODS

Fig. 4.

TIME IN SWEEP PERIODS

United States Patent Office 3,253,277
Patented May 24, 1966

3,253,277
RADAR SYSTEM EMPLOYING SEQUENTIAL ANALYSIS
Glenn W. Preston, Oreland, and Walter H. Chudleigh, Jr., Norristown, Pa., assignors to General Atronics Corporation, Bala-Cynwyd, Pa., a corporation of Pennsylvania
Filed Sept. 4, 1959, Ser. No. 838,087
31 Claims. (Cl. 343—7)

This invention relates to search radar means and method and more particularly to radar means and method for sequential statistical analysis and is applicable to a variety of search and surveillance apparatus known generically as radar. To clarify the following description and claims, certain terms will first be discussed.

By radar we here mean any device which utilizes electro-magnetic radiations (visible light, infrared, radio waves, etc.) to detect the presence and possibly the position and possibly also the velocity of objects which emit or reflect the electro-magnetic waves. This invention is applicable to radars which radiate radio-waves—known as active radars—and detect the reflection of these waves from various objects, as well as to radars—known as passive radars—which do not radiate, but detect electro-magnetic emanations from objects. The term "target" is commonly used to denote any object of interest which emits or reflects electro-magnetic waves.

The term "radar data" will denote the current or voltage developed by the radar on the basis of which target detection and target parameter (range, radial velocity, elevation angle, azimuth angle, etc.) estimation is to be performed. For purposes of exposition, the radiations of the active radar will be referred to as the "transmitted pulse," it being understood that the discussion is applicable also to the frequency modulated continuous wave transmissions in which an abrupt variation in the frequency of the transmitted signals, rather than in their amplitude, constitutes the "transmitted pulse."

The aggregate radar data received as a result of one pulse transmission will be referred to as a "sweep."

The component of the radar data contributed by the target will be referred to as "pulse echo," it being understood that the discussion is applicable also to passive radars.

In most cases of practical interest, the electrical signals constituting the radar data referred to above are created in large part by random electrical phenomena called "noise." The noise component of radar data obscures the pulse echoes and makes target detection with certainty impossible. Because of the random nature of radar data, the detection of targets from their pulse echoes is theoretically a problem of statistical analysis.

The ultimate basis for detecting the presence of a pulse echo is the statistical difference between radar data which contains only noise and that which contains pulse echoes.

Statistical analysis consists of performing arithmetic operations on data and generating numbers (estimates of parameters such as pulse echo delay) or decisions such as "no pulse echoes are present" or "a pulse echo is present" by the use of some predetermined criterion. Radar data processors such as embodiments of this invention perform, in effect, arithmetic computations on the radar data and indicate the presence of or absence of pulse echoes by comparing the generated (computed) voltage or current with a fixed threshold.

The present invention has to do with the application of sequential statistical analysis to radar (see "Sequential Analysis," A. Wald, John Wiley & Sons, New York, 1947).

The property of sequential statistical analysis which distinguishes it from traditional non-sequential analysis is this: in non-sequential analysis the quantity of statistical data used for detection is decided upon in advance and on the basis of that data a decision is reached (or a parameter value estimated) whereas in sequential analysis one sample datum is taken and on the basis of this, a decision is reached (for example, "a pulse echo is present" or "no pulse echo is present") or another sample is taken—this process continues until a decision is reached.

In terms of radar, non-sequential statistical anlysis is applicable when the length of time that electro-magnetic waves are received from some given part of space (the dwell time) is fixed. This is the case when the receiving beam of the radar scans at a constant rate for example. The embodiments of such radars are characterized by constant parameter (time invariant) electrical circuits.

Radars to which the present invention are applied have transmitting and receiving beams which do not scan at a constant rate but which scan intermittently, in discrete steps, the dwell time at any one position is not determined in advance but is under the control of the radar data processing device which in effect performs a sequential statistical analysis upon the radar data. Such radars are characterized by time varying electrical circuit parameters (the electrical parameter values are reset to certain values when a detection decision has been reached and the transmitting or receiving beams are advanced to a new position) and by control over the transmitting and/or the receiving beam by the radar data processor.

The advantage of sequential over non-sequential statistical analysis is that the amount of data required (the dwell time in radar) for sequential analysis is on the average significantly less than that required by an equivalent non-sequential analysis.

The present invention makes possible an improvement in performance of radar which can be utilized to obtain one or more of the following results:

(1) The average scan or search rate can be increased without loss of detection performance or increase in transmitter power or increase in number of radars.

(2) The average transmitter power can be decreased, or alternatively, weaker pulse echoes can be detected without a decrease in the average scan rate or an increase in number of radars.

(3) Fewer radars can be used without loss in detection performance, increase in transmitter power or decrease in the average scan rate.

A brief discussion of sequential statistical analysis will make what follows clearer.

The illustrative case is that of a pulsed active radar operating non-coherently; that is, the radio frequency phase of the transmission is not controlled but changes discontinuously in a random manner from pulse to pulse. In that case, target detection must be done at video, i.e., following envelope detection.

The probability density function of the voltage R at video received at terminal input is $$P(R/P) = \frac{R}{N_o} \exp\left(-\frac{R^2+P^2}{2N_o}\right) I_o \frac{(RP)}{N_o}$$

$$P(R/O) = \frac{R}{N_o} \exp\left(-\frac{R^2}{2N_o}\right)$$

where $N_o$ is the average noise power in the I.F. amplifier, i.e., just before the envelope detector and P is the peak signal voltage in the I.F. amplifier. $I_o(x)$ is the Bessel function of zeroith order with imaginary argument. (Refer to "A Statistical Theory of Target Detection by Pulsed Radar," Mathematical Appendix, J. L. Marcum, RM-753, Rand Corp., Santa Monica, California.)

Where the noise arises from thermal and atmospheric phenomena, the noise contributions on successive pulses are statistically independent. The signal amplitudes on the other hand are substantially equal at corresponding instants in successive sweeps so that the probability density for $n$ voltages $R_1$, $R_2$, $R_n$ at corresponding points in successive sweeps is $$\prod_{i=1}^{n} P(R_i)$$

In sequential statistical analysis, the basis for deciding whether the signal is present or not present $(P=O)$ is the following. After the first pulse transmission, the voltage $R_1$ is sampled during the sweep, and the quantity $$Z_1 = \log \frac{P(R_1/P)}{P(R_1/O)} = \log I_o \frac{(R_1 P)}{N_o}$$

is computed and compared with two numbers, A (which is greater than zero) and B (which is smaller than zero). If $Z_1$ is greater than A, an electrical pulse is generated which indicates the presence of a pulse echo and is also used to cause either the transmitting or receiving beam or both to advance to a new position, while if $Z_1$ is smaller than B a different electrical pulse is generated which indicates the absence of a pulse echo and also advances the beams; otherwise, another voltage $R_2$ is obtained by transmitting another pulse and sampling the sweep at the point corresponding to the same range element. The quantity $$Z_2 = \log I_o \left( \frac{R_2 P}{N_o} \right)$$

is then computed and the sum $Z_1+Z_2$ is evaluated and compared with A and B as before and so on, the process being continued until the sum $Z_1+Z_2+Z_3 \ldots$ etc., first becomes greater than A or falls below B.

It is seen that the arithmetic operations can be broken down into the following sequence:

(a) an instantaneous change in amplitude which converts any voltage $x$ into a voltage equal to $I_o(x)$,
(b) addition of successive values of $I_o(x)$, one at a time,
(c) after each addition, a comparison with two preset thresholds generating either:
  (1) a decision as to the presence of a signal,
  (2) the decision to continue the signal analysis.

This invention, therefore, relates to means and methods for:

(1) Changing the amplitude of voltages or current delivered by the radar receiver,
(2) Adding successive said voltages which correspond to the same target,
(3) Comparing the added voltage with two thresholds,
(4) Controlling the radar beam when either one of the thresholds is passed.
(5) Controlling the radar indicator when either one of the thresholds is passed,
(6) Erasing all stored data from the adding means when either one of the thresholds is passed.

It is therefore the primary object of this invention to provide a new improved apparatus and method to be used in conjunction with other radar apparatus, which permits the search of a given region for "targets" to be carried out in minimum time without degrading detection sensitivity.

Another object of the invention is to provide a new and improved apparatus and method for searching in sequence a predetermined region of space which takes into account the data derived from a particular direction for determining its scanning rate from one direction to its next direction of search.

Another object of the invention is to provide a new and improved radar means and method which utilizes sequential probability ratio analysis of signals for controlling the scan rate of the transmitting beam and detecting pulse echoes.

Another object of the invention is to provide a new and improved radar means and method which may have the criteria for determining the presence or absence of pulse echoes adjusted according to desired statistical analysis which is to be employed in such evaluation.

Another object of the invention is to provide a new and improved radar means and method utilizing a processing circuit and technique for evaluating radar data according to predetermined criteria and as a function of time during a sampling interval.

Another object of the invention is to provide a new and improved radar means and method which in addition to increasing the efficiency of deriving results in a minimum of time also increases the reliability of detection by lowering the probability of indicating a false target or lowering the probability of failing to detect a pulse echo.

Another object of the invention is to provide a new and improved radar detection means and method whose sensitivity may be controlled for the purpose of determining the degree of detection reliability or accuracy of the positional information to be derived and the time during which such information may be obtained.

The above objects as well as many other objects of the invention may be achieved by providing a detection radar means having a signal processing means for receiving radar data derived from a particular direction of space. The signal processing means include a signal adder which also receives signals from a storage means and a sensitivity control means for delivering an output signal. The output signal from the adder is stored by the storage means for delivery to the adder for combining signals of the same range. The signals delivered by the sensitivity control means may be adjusted for determining the sensitivity of the search radar means.

The output signal from the signal processing means derived from the adding means is received by a detecting means for determining the presence or absence of a target in that direction towards which the radar transmission beam is directed. The detecting means delivers output signals showing the presence of a target at a particular range according to the criteria and information and signals delivered by the control means. Output signals from the detecting means are also delivered to the control means for determining the completion of a search operation, after which the control means delivers a signal to position the radar search antenna to its next search orientation.

The method of the invention includes deriving radar data from a particular direction in space and continuing to receive such data, adding current data to data previously derived from the respective ranges, delivering composite data to a detecting means for evaluation in accordance with predetermined statistical criteria for determining the presence or absence of pulse echoes, and determining the presence or absence of pulse echoes in accordance with such criteria and proceeding to evaluate information signals derived from a next radar transmission beam orientation as soon as the preceding search operation has been completed.

The above will become more apparent, as the more detailed description which follows is read in connection with the following figures, in which.

Like parts are designated by like reference numbers throughout the several drawings.

Figures 1, 2:
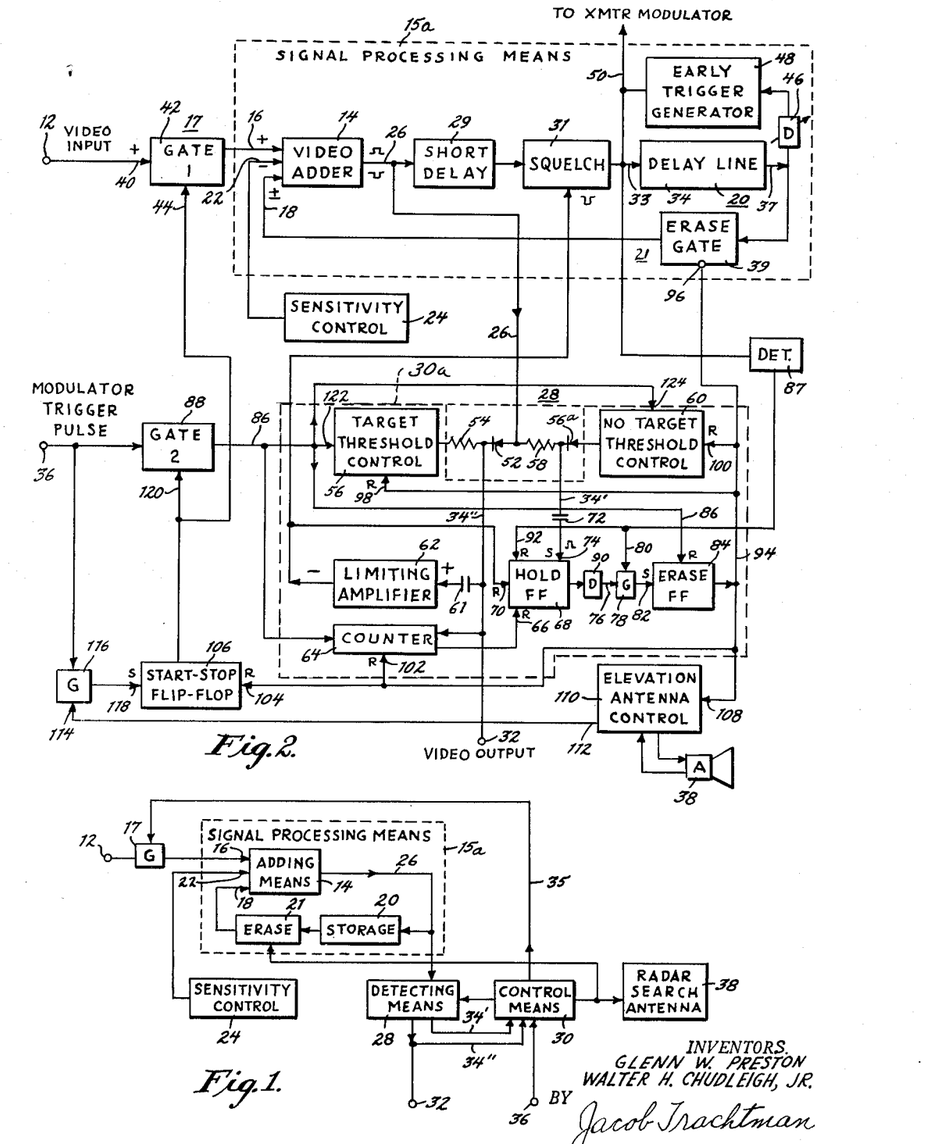
FIGURE 1 is a schematic drawing in block form illustrating those radar means which constitute the portions of a search radar system embodying the invention.
FIGURE 2 is a schematic drawing in block form, showing in greater detail the radar means of FIGURE 1.

The FIGURE 1 is a graphic representation in block form of a radar means embodying the invention.

The radar means has an input terminal 12 for receiving data from a radar search antenna 38. These data are delivered to terminal 12 in the form of video signals via suitable circuits for deriving such signals from an antenna. Since such circuits are well known and not in any way peculiar to the present invention, they have been omitted from the illustration and from the detailed description in order to avoid complicating either unnecessarily. The signals received by the input terminal 12 are delivered through a gating means 17 to the first input line 16 of an adding means 14 of a signal processing means 15. The adding means 14 also receives signals on a second input lead 18 from a signal storage means 20, through a signal erasing means 21 of the processing means 15, while a signal is delivered to a third input line 22 from a sensitivity control means 24. The adding means 14 provides a composite signal to its output line 26 which is delivered to the storage means 20 for delivery by the storage means at a later time so that the input signals received by the adding means 14 at its first and second input lines 16, 18 correspond to the same distance or range from the radar. The signal delivered by the sensitivity control may be varied to adjust the sensitivity of the radar means in detecting signals delivered to input terminal 12.

The signal from the processing means 15 is also delivered from the line 26 of the adding means 14 to a detecting means 28. The detecting means 28 receives control signals from a control means 30 for conditioning the detecting means 28 for delivery of output signals to its terminal 32 for indicating the presence of a target or indicating the ambiguity of the presently available radar data for deciding that a signal is not present.

Output signals from the detecting means 28 are delivered over lines 34″ and 34′ to the control means 30. The control means 30 determines the completion of the search and detection operation from the signal derived from the detecting means over lines 34″ and 34′. The presence of a signal on line 34′ indicates that the transmitting beam must continue to dwell at its present position in space while another signal is transmitted in order to obtain sufficient returns for detection purposes. The signal from the detecting means 28 on line 34″ indicates that a reflecting object is present and the timing of the signal over this line indicates its range in the normal manner for pulsed radars. Eventually, the signals on line 26 corresponding to all ranges will either indicate the presence of reflecting objects or the absence of reflecting objects at which time the search in the sector being illuminated by the transmitted beam has been completed or alternatively a timing signal is received on the input terminal 36 which terminates the search for that antenna position. The control means 30 delivers an output signal for advancing the position of the radar search antenna 38 to its next search position, delivers a signal to the erasing means 21 in the signal processing means 15 to wipe out the data stored in the storage circuit 20, and also delivers a signal over line 35 to inhibit the gating means 17 from delivering signals to the adding means 14 at this time.

FIGURE 2 is a diagrammatic representation in block diagram form illustrating in greater detail the radar search means of FIGURE 1.

The information input terminal 12 receives video signals which are derived through the radar search antenna 38. The signals appearing at the input terminal 12 consists of echoes of the signal transmitted through the radar transmitter beam which are delayed from the time of transmission by a period corresponding to the distance of the reflecting object. Thus, a series of pulses may be received by the terminal 12 each of which corresponds to a target at a particular range from the radar antenna depending upon the arrival time of the pulse at the antenna relative to the time of the pulse transmission.

The video signals on the input terminal 12 are delivered to the lead 40 of a first gate 42 for transmission to the input lead 16 of the video adder 14 of the signal processing means 15a when a permissive signal is also present on its input lead 44. The signal processing means 15a corresponds to the signal processing means 15 of FIGURE 1 in terms of the basic functions performed. However, in FIGURE 2, this signal processing means is, of course, illustrated in greater detail than the corresponding means in FIGURE 1.

The video adder 14 delivers positive and negative going signals at its output lead 26 corresponding to the sum of the input signals received on the input leads 16, 18, and 22. The signal from the video adder 14 is delivered through a short delay line 29 to a squelch circuit 31 for receipt at the input lead 33 of a delay line 34 which serves as the signal storing means 20 previously mentioned in connection with FIG. 1. Signals from the output lead 37 of the delay line 34 are delivered through an erase gate 39 of the erasing means 21 to the input line 18 of the video adder 14. The total delay time of the return circuit from the output lead 26 to the input lead 18 of the video adder 14 is such as to present signals on the input line 18 having the range corresponding to the signals delivered at the first input line 16 of the video adder 14.

In this manner, current signals derived at the antenna and received by the input terminal 12 are continually added to previously received and stored information of the same range which is being presented at the feedback input lead 18 of the signal processing means 15a.

If a target signal is consistently being received from a given range, these signals will be continually combined for each cycle of transmission operation so that the signal at the lead 26 tends to build up at times corresponding to the target range and at a rate which is proportional to the amplitude of the pulse echo. Error signals or randomly reflected information which may be considered to be noise are not consistently built up, but in fact are caused to be degenerated by the addition of the negative input signal on the third input line 22 provided by the sensitivity control 24. Thus, if a positive going signal delivered by the leads 16 and 18 represents the presence of a signal at a given range, the negative going signal on input line 22 reduces its amplitude by a predetermined amount. If the incoming signal is less than or close to the negative signal being introduced by the sensitivity control, it will not gain in amplitude or it will gain in amplitude at a relatively slow rate. Increasing the value of the negative signal provided by the sensitivity control reduces the sensitivity of the radar means, while reducing the negative amplitude of the signal delivered to the input line 22 from the sensitivity control 24 increases the sensitivity and rate of build up of signals. Where signals are erratic or noiselike, the sensitivity control 24 acts to remove and degenerate such signals, since their effect is not additive. This allows true target signals to be readily distinguished from error signals, especially as information is derived and combined with the previously stored information of the signal processing means 15a.

In order to assure the arrival of signals corresponding to the same range simultaneously at the input lines 16, 18 of the video adder 14, the output lead 37 of the delay line 34 is connected through a delay network 46 having a variable delay, to an early trigger generator 48. The trigger generator 48 may be a relaxation type oscillator which is triggered to provide an output signal at its line 50 upon the deliver of an input signal. The output signal on line 50 is delivered to the transmitter modulator of the radar system (not shown) which may be used in connection with the radar means for initiating the production of a radar pulse which is to be radiated by the antenna 38. The output line 50 also delivers a signal to the input lead 33 of the delay line 34 for transmission through the delay line 34 and delay network 46 to the generator 48. By this means, a series of pulses are delivered to the line 50 so that any variation in delay of the delay line 34 provides an adjustment to assure concurrent receipt of information corresponding to the same range at the video adder 14. In order to compensate for any delays in the transmitter and receiving apparatus, the variable delay network 46 may be adjusted to obtain the proper concurrence of target signals at the leads 16, 18 of the video adder 14. Any variation in delay which then occurs in the delay line 34 will be automatically compensated for by the action of the trigger generator 48.

The signal circulated through the delay line 34 for actuating the generator 48 may be of a form which will readily differentiate it from the information signals also passing through the delay line 34. This may be done by use of a special carrier frequency or other means which may be detected by the trigger generator 48 and will not interfere with the information signals transmitted by the delay line 34. Various forms of apparatus are known for performing the functions of the early trigger generator 48 and its associated equipment in controlling the production of transmitted radar pulses at the desired periodicity. Representative forms of such apparatus are disclosed in "Electronic Time Measurements," which is Volume 20 of the Massachusetts Institute of Technology Radiation Laboratory Series, published 1949 by McGraw-Hill Book Company, Inc., New York. The apparatus in question is described, illustrated and analyzed in Section 12.30, on pages 515 to 522 of the above-identified publication.

The output signal on line 26 from the video adder 14 is also delivered to the anode of a detector diode 52 of the detecting means 28. The cathode of the diode 52 is connected to the video output terminal 32 and through a resistance 54 to the target threshold control 56 forming part of the control means 30a. The cathode of a second detector diode 56a of the detecting means 28 is also connected to the output lead 26 of the video adder 14 through a resistor 58 while its anode is connected with the no-target threshold control 60 of the control means 30a. Control means 30a of FIG. 2 corresponds to the control means 30 of FIG. 1 in terms of the basic function performed. However, in FIG. 2 the control means is, of course, illustrated in greater detail than the corresponding control means of FIG. 1.

The output signal from the diode 52 is also delivered over the line 34" and through a coupling capacitor 61 to the input of a limiting amplifier 62 of the control means 30a. The limiting amplifier 62 produces a negative going signal responsive to a positive going input pulse and delivers its output to the squelch circuit 31.

Upon receipt by the squelch circuit 31 of a negative going signal from the limiting amplifier 62, signals presented to the input of the squelch circuit 31 from the short delay line 29 are prevented from being delivered to the input lead 33 of the delay line 34. In place of such input signals, a large negative going signal may be delivered by the output of the squelch circuit 31 to the input lead 33 of the delay line. This may be achieved by using a gate for inhibiting the delivery of signals received from the short delay line 29 upon the delivery of a signal from the limiting amplifier 62, while triggering a multistable flip-flop circuit to generate a negative going pulse signal for delivery to the delay line 34.

The reason for the delivery of the negative going signal at this place will be described in detail below in connection with the operation of the radar means.

Signals delivered by the output line 34" of the diode 52 are also received by a counter 64 for indicating the number of echoes detected. An output signal from the counter 64 may be delivered to the reset lead 66 of a hold flip-flop circuit 68 of the control means 30a, while the output signal from the output of the limiting amplifier 62 is delivered to the reset lead 70 of the circuit 68.

Positive going signals from the junction of the diode 56a and resistor 58 of the detecting means 28 are also delivered over the output line 34' through a coupling capacitor 72 to the set lead 74 of the flip-flop circuit 68.

There will be no output signal on the line 34' if the signal on line 26 has a voltage level lower then the voltage delivered to the anode of the diode 56 by the threshold control 60. However, negative and positive going signals will be delivered to the line 34' if the signals on line 26 have levels above said threshold level. Although negative going signals will also be delivered by line 34' through the capacitor 72 to the flip-flop circuit 68, such signals will not act to set the circuit 68, since only a positive going impulse will have this effect.

The hold flip-flop circuit 68 when in its set condition delivers an output signal through a delay 90 to input line 76 of a gate 78 inhibiting the delivery of an output signal by the gate 78. In the absence of an inhibiting signal on line 76, the gate 78 delivers an output signal in the presence of a timing signal at its input 80 from the detector 87 upon the occurrence of a signal from the generator 48. When a timing signal is passed by gate 78, it sets an erase flip-flop circuit 84 of the control means 30a.

The timing signals derived from the detector 87 are also delivered to the reset lead 92 of the hold flip-flop circuits 68. The detector 87 delivers an output signal responsive only to the output signal from the generator 48 and is not responsive to the information signals delivered to the input 33 of the delay line 34.

The delay 90 prevents the delivery of an output pulse by the gate 78 when the flip-flop 68 is in its set condition upon the delivery of a timing signal from detector 87 by delaying the removal from the gate circuit 78 of the inhibiting signal. Thus, with the delivery of a reset signal to flip-flop circuit 68 concurrently with the receipt of signal on lead 80 of gate 78, the gate 78 will not deliver an output signal if the flip-flop circuit 68 had been in its set state.

The erase flip-flop circuit 84 in its set condition delivers an output signal to the control line 94 which is received at the input 96 of the eraser gate 39 inhibiting the erase gate 39 and preventing the delivery of signals to the input line 18 of the video adder 14 from the output line 37 of the delay line 34.

The erase flip-flop circuit 84 is reset upon the occurrence of an output signal on line 86 of the gate 88 assuring that all the information stored in the signal processing means has been removed. The output signal on the erase control line 94 is also delivered to the reset lead 98 of the target threshold control 56, the reset lead 100 of the no-target threshold control 60 and the reset terminal 102 of the counter 64 for clearing the radar means preparatory to the initiation of a detection period. The signal on line 94 is also delivered to the reset lead 104 of a start-stop flip-flop circuit 106 and the input lead 108 of an elevation antenna control means 110.

The receipt of a signal on lead 108 of the antenna control indicates that the antenna is to be advanced to its next direction or orientation in space which is to be searched. Such control may be achieved by a program means which determines the successive positions of the radar antenna 38 or simply may comprise a relay lighting a bulb indicating that the antenna should be positioned to its next orientation. Automatic means are known for effectively positioning the antenna in different orientations in response to successive control signals such as those produced on lead 108. One such means is described and illustrated together with the antenna to which it is applicable, on pages 453 and 454 of the March 1959 issue of the "Proceedings of the IRE" in a contribution entitled, "Volumetric Scanning of a Radar with Ferrite Phase Shifters." Alternatively, the antenna may be repositioned manually in any known manner according to a predetermined program sequence after successive lightings of the above-mentioned bulb in response to successive control signals produced on lead 108. The antenna control device 110 is provided with an outut lead 112 which delivers a signal indicating that the antenna 38 has assumed its new position. For simplicity this may also take the form of a switch which may be set to give a ready signal on line 112 and is reset upon the occurrence of a signal on the input line 108.

An output signal at line 112 is delivered to the input 114 of a gate 116 conditioning it for the transmission of timing signals received at the input terminal 36 to the set input lead 118 of the start-stop flip-flop circuit 106. When in its set condition, the circuit 106 delivers an output signal to the input lead 120 of the gate 88 conditioning it for delivering output timing signals to the line 86 from the input terminal 36.

The timing signals delivered to the terminal 36 may be derived from the modulator trigger pulses of the radar apparatus in connection with which the radar means may be used. The modulator trigger pulses operate to produce the signal pulses which are delivered to the antenna for transmission and thereby provides a timing signal for each of the transmitted pulses.

Figure 3:
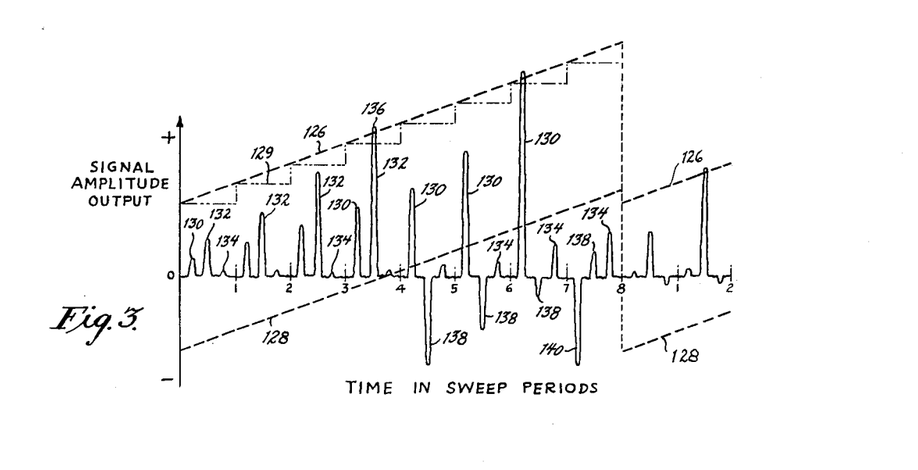
FIGURE 3 is a graphic representation illustrating representative random data and the mode of operation of the radar means of FIGURE 2.

In addition to being delivered to reset the erase flip-flop circuit 84, the timing signals on line 86 are also received by the input leads 122, 124 respectively of the target threshold control 56 and no-target threshold control 60. The timing signals are utilized by the threshold controls 56, 60 when the output signals produced by the controls 56, 60 are to be functions of time, or more particularly functions of the sweep cycles of a detection period, as illustrated in FIGURE 3 by the dashed lines 126, 128 or 129.

When the upper and lower threshold voltages generated by the controls 56, 60 are to be linear as shown by the dashed lines 126, 128, the generated signals may be achieved by the use of a potentiometer which is driven by a constant speed motor. If the generated output signals of the controls 56, 60 are to vary as step functions such as those illustrated by the dashed line 129 of FIGURE 3, then this may be achieved by the use of stepping relays or electronic switching means which are actuated at the beginning of each sweep cycle by the delivery of a timing signal on the line 86 to step it to its next voltage output level. Such step function generating means are well known in the art and may readily be achieved. The controls 56, 60 may also provide upper and lower voltage output signals which are not a function of time and are represented by the horizontal dashed lines 133, 137 respectively of FIGURE 4.

In operation, when the antenna 38 is positioned for the initiation of a detection period, a signal is delivered by the control means 110 over its line 112 conditioning the gate 116 for delivery of output signals. Thus, upon the occurrence of an input timing pulse 36 the gate 116 delivers an output signal setting the start-stop flip-flop circuit 106 and conditioning the gate 42 for delivery of video input signals from the terminal 12 and conditioning gate 88 for the passage of timing pulse signals from the input terminal 36.

Video signals from terminal 12 are delivered to the input lead 16 of the video adder 14 together with sensitivity control signals received at the input lead 22, while no signals are received at the input lead 18 during the first cycle or sweep period of operation. The combined signals are delivered to the output line 26 of the adder 14 for passage through the short delay line 29, the squelch circuit 31, the main delay line 34, and are returned through the erase gate 39 to the input line 18 of the adder 14 for being concurrently received with signals on the input line 16 of the same range. In order to achieve concurrence in the combination of signals of the same range at the video adder 14, the early trigger generator 48 is actuated by signals circulating through the delay line 34 for generating output signals on line 50 for delivery to the transmitter modulator.

Output signals from the signal processing means 15a are also derived from the output line 26 of the video adder 14 and delivered to the signal detecting means 28. The signals from line 26 may be positive going and negative going for indicating the presence or absence of targets at different ranges corresponding to the time of their occurrence after the initiation of a signal cycle or period. For the purposes of description, the positive going signals are taken to indicate the presence of a target, although a negative going signal could be similarly utilized.

If the amplitudes of the positive going signals on line 26 are less than the positive voltage delivered to the cathode of the diode 52 by the target threshold control 56, then an output signal is not delivered to the output line 34" or the video output terminal 32. However, upon the occurrence of a signal which is more positive than the threshold signal of the control 56, a positive going impulse is delivered to the line 34" and the video output terminal 32. Since the threshold signal of the control 56 may be a function of time, it may require a more positive signal on the line 26 to provide an output signal on line 34" as the number of sweep periods or cycles increases.

Upon the delivery of an output signal on line 34" representing a target at a given range, a pulse is also received by the limiting amplifier 62 which delivers a signal to the squelch circuit 31. The delivery of such a signal to the squelch circuit 31 prevents it from passing the target signal which was delivered to the video output terminal 32. This prevents this signal from circulating and having its amplitude increased by the successive adding operations of the video adder 14. This may be desirable to prevent a large target signal from contaminating the signals being circulated, and allowing the detection of smaller or less prominent target signals. In order to delay the rapid build up of such a signal, the squelch circuit 31 also may operate to deliver a negative going signal to the delay line at the particular range of the target signal as will be graphically illustrated in connection with FIGURE 3. The short delay line 29 is provided in order to delay the arrival of the target signal from line 26 to the squelch circuit 31 until the detecting means 28 and limiting amplifier 62 of control means 30a have provided the signal required for actuating the squelch circuit 31 for eliminating the target signal which has been detected and delivered to the output terminal 32.

If the signals delivered to the output line 26 remain below the threshold signal level provided by the no-target threshold control 60, the detector 56a of the detecting means 28 conducts and maintains a constant minimum voltage level on the output line 34' so that no signal impulse is delivered through the coupling capacitor 72 to the set lead 74 of the hold flip-flop circuit 68. However, upon the occurrence of a positive going signal above the minimum level of the threshold signal provided by the control 60, a positive pulse is delivered to the output line 34' and through the capacitor 72 to the set lead 74 of the flip-flop circuit 68 placing it in its set condition. It is noted, that the positive going pulse sets the flip-flop circuit 68 when its amplitude does not exceed the amplitude of the upper threshold signal level provided by the control 56 which must be passed for delivering an output signal to the terminal 32 to indicate the presence of a target. However, should the positive going pulse on the line 26 be sufficiently positive to deliver an output signal to the line 34" and terminal 32, a signal from the limiting amplifier 62 is also delivered to the flip-flop circuit 68 for maintaining the circuit 68 in its reset condition and preventing it from being placed in its set condition.

The hold flip-flop circuit 68 is placed in its reset condition preceding the beginning of each sweep period by the receipt of a signal at its input 92 from the detector 87. Upon the occurrence of a positive going signal which is more positive than the threshold signal of the control 60 and which does not exceed the upper limit provided by the signal from the threshold control 56, the flip-flop circuit 68 is placed in its set state. This inhibits the gate 78 and prevents the delivery of a timing signal from detector 87 to the erase flip-flop 84 for placing it in its set condition and providing an erase output signal on its output line 94 for terminating the detection period and conditioning the radar means for the initiation of a succeeding detecting period.

This means that the hold flip-flop circuit 68 will be placed in its set condition as long as a positive going signal occurs on line 26 having a maximum value intermediate the upper and lower threshold signals from control 56, 60. The placing of the circuit 68 in its set condition indicates that all of the received signals which are considered by the radar means have not been sufficiently processed to determine whether they constitute a target signal. The signal processing means 15a thus continues to receive video input signals from the terminal 12 until all of the signals have been determined by the delivery of output signals at appropriate ranges at the terminal 32. Since the delivery of such an output signal results in its elimination by the squelch circuit 31 when the last of such signals has its amplitude sufficiently increased to be delivered as a target signal, the line 34' will fail to deliver a positive going signal to the hold flip-flop circuit 68 so that the circuit 68 remains in its reset condition allowing a timing signal from detector 87 to pass through the gate 78 and set the flip-flop circuit 84 for delivering an erase signal to the control line 94.

The delivery of the erase signal to line 94 results in the removal of the stored information by the inhibition of the erase gate 39 and the resetting of the start flip-flop circuit 106 to inhibit gates 42 and 88 while the signal processing means 15a is being cleared, and the target controls 56, 60 and counter 64 are being reset. The antenna control 110 is also energized at its input terminal 108 for conditioning the actuation of the antenna 38 to its next search orientation. When the antenna has been repositioned, the gate 116 is again conditioned for the initiation of a succeeding detection period, while the erase flip-flop circuit 84 is reset by a timing signal derived over line 86, and the counter 64 is set at its initial position.

The counter 64 may be utilized for delivering a reset signal to the hold flip-flop circuit 68 upon the occurrence of a large number of target signals on the input line 16 or the output line 34" as may be encountered upon the receipt of error or interference signals simulating target signals and thereby providing a large number of signals which prevent the completion of a detecting period by maintaining the hold flip-flop 68 in its set condition over an extended period of time. The counter 64 may also be set for determining the maximum number of periods or cycles of a detection period by receiving timing signals from the line 86 and delivering an output reset signal after the occurrence of a predetermined number of sweep periods.

The FIGURE 3 illustrates the mode of operation of the radar means of FIGURE 2 in which the sensitivity control means 24 is adjusted to provide substantially no signal input to the line 22 of the video adder 14, but the threshold controls 56, 60 generate threshold signals which are a function of time. The dashed lines 126 and 128 represent respectively the signal voltages respectively generated by the controls 56, 60 providing upper and lower threshold signal levels. The levels rise gradually as a function of time so that they have a positive slope with respect to time in sweep periods against which the signal amplitude is plotted. Similarly, the threshold levels 126, 128 may be replaced by step function signal levels shown for example by the dashed line 129 representing the upper threshold and which are actually timed by the receipt of timing pulse signals on line 86 for advancing the threshold levels with each sweep period. It is noted that the threshold controls 56, 60 may provide threshold signals which are more complex and in accordance with particular criteria or statistical methods to be utilized in evaluating the presence or absence of target signals. Similarly, various combinations for the threshold signals and sensitivity control means output signals may be utilized to obtain the required results.

Referring to FIGURE 3, upon the initiation of a sweep period, as an example, three pulses 130, 132, and 134 of different amplitudes and ranges are successively received by the video adder 14 and delivered over its output line 26. During the second interval or period, the signals are increased by being added to the incoming signals, which process is also repeated during the third sweep period.

During the fourth sweep period the signal 132 having the largest amplitude has been sufficiently increased so that its peak 136 exceeds the upper threshold signal 126 providing a target output signal at the terminal 32.

During the fifth sweep period the target signal 136 has been suppressed and a negative going signal 138 has been placed in its range position. During the fifth sweep period, it is also noted that the first occurring signal 130 is increasing in value by being combined with newly received signals at that range but has as yet not passed the upper threshold signal level 126. The signal 130, however, sets the hold flip-flop circuit 68 allowing the detection period to continue.

In the sixth sweep period, the signal 134 is falling below the lower threshold signal level 128 which is clearly evident during the seventh sweep period.

During the seventh sweep period, however, the first signal 130 has achieved sufficient amplitude to exceed the threshold signal level 126 to provide an output signal indicating a target at that range. By providing the reset signal to the lead 70 of the hold flip-flop 68 from the limiting amplifier 62 upon the occurrence of the target signal 130, and since none of the other signals exceeds the lower threshold signal level 128, the test is terminated at the end of the seventh sweep period.

By alternatively operating the means 10 with the lead 70 of the hold flip-flop 68 disconnected, the test continues during the eighth sweep period as shown in FIGURE 3. Accordingly, during the eighth sweep period, a negative going signal 140 generated by the squelch circuit 31 is substituted in the corresponding range of the signal 130. Also, none of the signals 140, 138, 134, has an amplitude intermediate the threshold levels 126, 128, but have amplitudes all lying below the lower threshold signal level 128. This results in the termination of the detection period.

Thus, with the originally occurring signals 130, 132, and 134, the intermediate range signal 132 which had the greater amplitude provided an output signal during the fourth sweep period, while the signal 130 closest in range and of smaller amplitude provided a target signal, after evaluation by the radar means, during the seventh sweep period, and the most distant target signal 134 failed to increase at a sufficient rate for continued consideration by the radar means and thus did not provide an output signal.

In this manner, adjusting the threshold values 126, 128 and their slope or rate of increase, the sensitivity of the radar means is determined, so that only signals having a certain amplitude and increasing at a sufficient rate are considered for evaluation, and the detecting period is terminated upon the evaluation of those signals which fall within the desired classification. Thus, if the slope of the threshold signals 126, 128 were reduced, to a sufficient degree, the presence of the target 134 would be detected after a sufficient number of sweep periods. Of course the increase of sensitivity, in addition to yielding information on smaller objects providing an echo signal of lower amplitude, also increases the time which may be required to obtain the results desired with a required reliability. The reliability of the radar means is increased by varying the threshold signals 126, 128 as a function of time so that apparent target signals which are not consistently received at a particular range, but are in the form of noise signals of arbitrarily positive and negative amplitudes, do not build up sufficiently with the passage of time to exceed the upper threshold level 126, but rapidly fall below the lower threshold level 128 and are removed from consideration as possible target sources. Since, in the example provided, the lower threshold signal level 128 remains negative until the fifth sweep period, the presence of any positive going signals during the first four sweep periods will not permit the termination of the detection period. This means that if for some reason the radar means receives very small target signals during the first several cycles, the detection period will not be terminated until after a minimum of four cycles during which the presence of a target signal of required amplitude will become evident and provide for the delivery of an output signal by the radar means. Of course, if desired, the circuit may be provided with means for allowing the completion of a detection period after only one sweep cycle or only after any desired minimum or maximum number of periods.

The above results may also be achieved by different modes of operation of the radar means, another of which is described in connection with the description of FIGURE 4.

Figure 4:
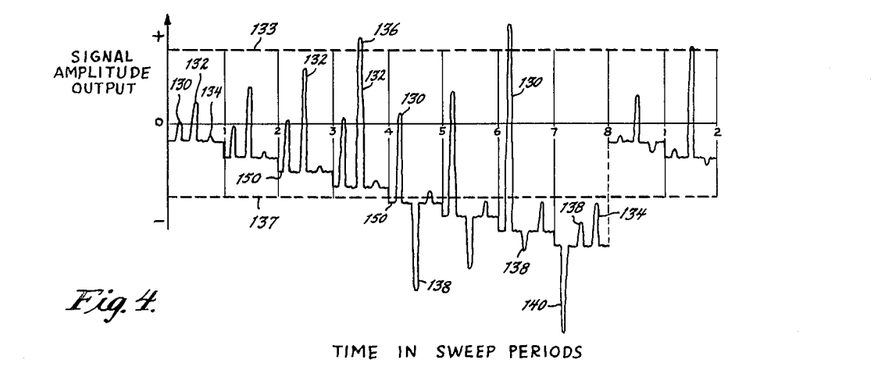
FIGURE 4 is a graphic representation similar to FIGURE 3 showing a different mode of operation of the radar means of FIGURE 2.

The FIGURE 4 illustrates the mode of operation of the radar means in which the threshold controls 56, 60 respectively provide constant positive and negative signal levels represented by the horizontal dashed lines 133, 137.

For purposes of ready comparison and simplicity of explanation, the signals utilized for the illustration of FIGURE 4 are the same signals 130, 132 and 134 shown in FIGURE 3. However, the threshold signal levels 133, 137 remain constant with time, and the zero level for the signals is lowered with each sweep period or cycle by the addition of a predetermined negative signal delivered to the video adder 14 from the sensitivity control means 24. Corresponding to FIGURE 3, the amplitude of the negative signal delivered by the sensitivity control means 24 may be adjusted so that its level will lie below the lower threshold signal level 137, beginning with the fifth sweep period. Although the negative signal provided by the sensitivity control means 24 is constant and non-varying with time, its effect in each period is additive and thereby results in the downwardly moving step levels 150, in effect providing a relative step function for the signals.

The intermediate range signal 132 of the largest amplitude increases at a sufficient rate to provide an output signal during the fourth sweep period, while the closest range signal 130 of smaller amplitude provides an output signal during the seventh sweep period by passing the upper threshold level 133. During the eighth sweep period none of the output signals exceed the lower threshold level 137. This results in the termination of the detecting period, and the conditioning of the radar means for the initiation of a succeeding detecting period. For the initiation of a succeeding period, it is noted that it is not necessary to alter the threshold signal levels 133, 137, since they are not a function of time nor must the negative signal from the sensitivity control means 24 be reset. Adjustment of the negative value of the sensitivity control means 24, however, determines the sensitivity of the apparatus, as is readily evident from the FIGURE 4. For example, if the added negative signal is sufficiently large, only signals having a value greater than the sensitivity control signal will be able to increase in amplitude with each cycle. For signals having a positive amplitude less than the negative amplitude of the sensitivity control signal, such signals will be reduced in amplitude below the lower threshold signal level 137 as the number of sweep periods increases. Thus, such signals will be removed from consideration by the radar means and will not provide an output signal. As previously stated a time limit or maximum number of sweep periods for each detection period may be provided, so that slowly increasing signals do not unduly prevent the termination of a detecting period. The provision of such a maximum number of sweep periods for each detecting interval will also prevent regeneration of target signals at previously detected locations such as to result in the recurrence of the signal 132 a second time within the hold range of the circuit 68 as might occur by a prolonged continuation of the detecting interval. For instance, with the continuation of the ninth and tenth cycles the signal 138 of the eighth period might increase sufficiently to exceed the lower threshold level 137 and prevent termination of the detection period. However, the detection period may be sufficiently long to allow the regeneration and delivery of several signals from the same target during the detection interval.

It will, of course, be understood that the description and drawings, herein contained, are illustrative merely and that various modifications and changes may be made in the means and method disclosed without departing from the spirit of the invention. In particular: (1) the timing and gating pulses may be modified to permit entry of new information into the storage device 20 while old information is being erased by the erase gate 39; (2) the operation of the threshold control may be designed to delay target decisions for two or more transmitted pulses while allowing no-target decisions to occur in any transmission interval; (3) a third threshold above the target threshold may be provided to detect large amplitude interference and remove it from the video output 32; (4) amplitude limiting to reduce the level of interference prior to delivery to the input 12 may be employed; and (5) under favorable signal to noise conditions the system may operate with a transmitted pulse rate higher than that determined by the delay line to detect the presence or absence of targets with a single transmitted pulse with provisions for using the delay line period only to detect targets which require more than one transmitted pulse.

What is claimed is:

1. The method of detecting signals in the presence of interference which comprises: sequentially searching in controllable steps along one dimension for signals, establishing initial upper and lower threshold levels at the beginning of each step, programming the upper and lower threshold levels as the search continues on each step, adding up the signal power received during the dwell time on each step, comparing the instantaneous integrated signal power so added with the then instantaneous values of said upper and lower thresholds, and controlling the advance to the next step by logic circuitry using input signals from said upper threshold or said lower threshold.

2. Radar means comprising a signal processing means for receiving signals representing radar data which includes means for combining signals representing radar data from the same range and delivering output signals and storing means for storing said output signals, detecting means receiving signals from said processing means, and control means conditioning said detecting means for delivering an output signal when said stored signals exceed a predetermined threshold.

3. The radar means of claim 2 in which said combining means has a first input line for receiving said signals representing radar data, a second input line for receiving signals from said storing means and an output line delivering signals to said storing means.

4. The radar means of claim 3 in which said storing means is a signal delay line with a delay period for delivering signals to the second input line of said adding means corresponding to the repetition period of the signals being concurrently delivered to the first input line of said adding means.

5. The radar means of claim 4 further comprising a second detecting means receiving signals from said processing means, said control means conditioning said second detecting means for delivering an output signal when the output signal of said processing means exceeds a second threshold.

6. The radar means of claim 5 further comprising means responsive to delivery of an output signal by said first-mentioned detecting means to produce an indication of the absence of radar targets and means responsive to delivery of an output signal by said second detecting means to produce an indication of the presence of a radar target.

7. The radar means of claim 6 further comprising means responsive to a target absence indication occurring at least a predetermined interval after the last preceding target presence indication to erase the said signal stored in said storing means.

8. Radar means comprising a signal processing means for receiving signals representing radar data which includes adding means for combining signals representing radar data from the same range and delivering output signals and storing means for storing said output signals, detecting means receiving signals from said processing means, control means conditioning said detecting means for delivering output signals when said signals received from said processing means traverse a predetermined threshold, signal erasing means for removing information signals stored by said processing means upon the delivery of an output signal by said detecting means, and a signal gating means preventing delivery of signals representing radar data to said processing means upon the delivery of an output signal by said detecting means.

9. The radar means of claim 8 including antenna control means for repositioning a radar antenna from one position to another upon the delivery of an output signal from said detecting means.

10. The radar means of claim 9 including means for conditioning said signal gating means for delivering signals derived from said antenna to said processing means after said repositioning of the antenna.

11. The radar means of claim 10 in which said signal threshold varies as a function of time.

12. The radar means of claim 11 in which said control means has an input lead receiving radar pulse timing signals for controlling said signal threshold as a function of time.

13. The radar means of claim 12 including gating means preventing delivery of said timing signals upon delivery of an output signal by said detecting means and permitting delivery of said timing signals upon said repositioning of said antenna.

14. The radar means of claim 10 in which said adding means of said processing means has a first input line for receiving said signals representing radar data, a second input line for receiving signals from said storing means, a third input line, and an output line delivering signals to said storing means, and including a sensitivity control means delivering a signal to the third input line of the adding means of said processing means.

15. A radar system comprising: means for performing in sequence a plurality of radar search operations differently oriented with respect to a given coordinate system; means for limiting the duration of each of said search operation to a given period in the absence of reception during said period of radar echoes exceeding a given threshold value; and means responsive to the reception of radar echoes exceeding said threshold value during any one of said search operations to extend the duration of said one operation beyond said limited period.

16. The system of claim 15 further characterized by the provision of means for varying said threshold value as a predetermined function of time during each said search operation.

17. The system of claim 15 further characterized by the provision of means for limiting said extension of a search operation to a given maximum value.

18. The system of claim 15 further characterized by the provision of means responsive to the attainment of a given relationship between said threshold value and the radar echoes received during a given search operation to terminate said operation.

19. The method of detecting targets which comprises the steps of receiving signals from a selected direction in space, combining successive ones of said signals which are received from the same range, comparing said combined signals with a threshold value, terminating the reception of said signals from said direction when said combined signals traverse said threshold, and commencing to receive signals from a different direction in space following said threshold traversal.

20. The method of claim 19 including the step of erasing said combined signals when said combined signals traverse said threshold.

21. The method of claim 20 in which said threshold is a function of time during which signals are received from a particular selected direction in space.

22. The method of detecting targets which comprises the steps of receiving signals from a selected direction in space, combining successive ones of said received signals derived from the same ranges, comparing said combined signals with first and second thresholds, indicating the presence of a target when said combined signals traverse said first threshold, and erasing said combined signals and commencing reception of signals from a different direction in space when said combined signals traverse said second threshold.

23. The method of claim 22 in which said at least one of said thresholds is a function of the time during which signals are received from a particular selected direction in space.

24. Radar apparatus comprising: means for receiving radar data from a predetermined direction in space; means responsive to said received radar data to combine those of said data received at different times from substantially the same range; and means responsive to the traversal of a predetermined threshold value by said combined data to terminate said combining.

25. Radar apparatus comprising: means for receiving radar data from a predetermined direction in space; means responsive to said received radar data to accumulate those of said data received at different times from substantially the same range; and means responsive to the traversal of a predetermined threshold value by said accumulated data to terminate said accumulating.

26. Radar apparatus comprising: means for receiving radar data from a predetermined direction in space; means responsive to said data to accumulate those of said data received at different times from substantially the same range; and means responsive to the traversal of a predetermined threshold value by said accumulated data to erase said last-named data from said accumulating means.

27. Radar apparatus comprising: means for receiving radar data from a predetermined direction; means for accumulating those of said data received at different times from substantially the same range; means for defining for said accumulated data an upper and a lower threshold value; and means for sensing the passage of said accumulation of data from between said thresholds to beyond one of said thresholds.

28. Radar apparatus comprising: means for receiving radar data, said means being orientable to receive said data from different directions; means for combining data received at different times from substantially the same direction and range; and means responsive to the traversal of a predetermined threshold value by said combined data to change the orientation of said receiving means.

29. Radar apparatus comprising: an antenna orientable to receive radar data from different directions in space; means for establishing said antenna at one of said orientations, means for processing the radar data received by said antenna at said one orientation to accumulate data received from the same range in different sweeps; and means responsive to the attainment by said processed data of an accumulation lying outside of the range defined by two threshold values to terminate said accumulation and change the orientation of said antenna.

30. Radar means comprising: a signal processing means for receiving signals representing radar data and having a predetermined polarity, detecting means receiving signals from said processing means, sensitivity control means delivering to said processing means signals of polarity opposite to said predetermined polarity, said processing means adding said received and delivered signals and delivering combined output signals, signal storing means supplied with said combined output signals, means supplying the output of said storing means to said adding means for adding to said received and delivered signals, said detecting means being responsive to the traversal of a predetermined threshold by the output of said adding means to deliver an output signal.

31. The means of claim 30 characterized in that said signals delivered by said sensitivity control means are in the form of a continuous signal of fixed amplitude.

References Cited by the Examiner
UNITED STATES PATENTS

| | | | |
|---|---|---|---|
| 2,456,952 | 12/1948 | Kluender | 343—5 |
| 2,466,959 | 4/1949 | Moore | 343—17.1 |
| 2,492,120 | 12/1949 | Smith | 343—5 |
| 2,684,468 | 7/1954 | McClure et al. | 343—112.4 |
| 2,841,704 | 7/1958 | Sunstein et al. | 343—17.1 |
| 2,943,316 | 6/1960 | Covely | 343—17.1 |

CHESTER L. JUSTUS, *Primary Examiner.*

FREDERICK M. STRADER, *Examiner.*